(12) United States Patent
Wang et al.

(10) Patent No.: US 11,840,483 B2
(45) Date of Patent: Dec. 12, 2023

(54) METHOD FOR PREPARING HIGH-STRENGTH CORAL AGGREGATE CONCRETE UNDER LOW PRESSURE CONDITION

(71) Applicant: GUILIN UNIVERSITY OF TECHNOLOGY, Guilin (CN)

(72) Inventors: Lei Wang, Guilin (CN); Dapeng Yu, Guilin (CN); Jin Yi, Guilin (CN); Ping Chen, Guilin (CN)

(73) Assignee: GUILIN UNIVERSITY OF TECHNOLOGY, Guilin (CN)

( * ) Notice: Subject to any disclaimer, the term of this patent is extended or adjusted under 35 U.S.C. 154(b) by 499 days.

(21) Appl. No.: 17/256,770

(22) PCT Filed: Jun. 24, 2020

(86) PCT No.: PCT/CN2020/098037
§ 371 (c)(1),
(2) Date: Dec. 29, 2020

(87) PCT Pub. No.: WO2021/012867
PCT Pub. Date: Jan. 28, 2021

(65) Prior Publication Data
US 2021/0163359 A1   Jun. 3, 2021

(30) Foreign Application Priority Data
Jul. 24, 2019   (CN) .......................... 201910673815.9

(51) Int. Cl.
| C04B 28/04 | (2006.01) |
| C04B 14/28 | (2006.01) |
| C04B 28/06 | (2006.01) |
| C04B 103/32 | (2006.01) |
| C04B 103/50 | (2006.01) |

(52) U.S. Cl.
CPC .............. *C04B 28/04* (2013.01); *C04B 14/28* (2013.01); *C04B 28/06* (2013.01); *C04B 2103/32* (2013.01); *C04B 2103/50* (2013.01); *C04B 2201/50* (2013.01)

(58) Field of Classification Search
CPC ......... C04B 28/04; C04B 14/28; C04B 28/06; C04B 2103/32; C04B 2103/50; C04B 2201/50; C04B 28/08; B28B 1/14; B28C 5/08; B28C 5/464; Y02W 30/91
See application file for complete search history.

(56) References Cited

FOREIGN PATENT DOCUMENTS

| CN | 105936593 |   | 9/2016 |
| CN | 106149872 | A * | 11/2016 |
| CN | 108218350 |   | 6/2018 |
| CN | 108640551 |   | 10/2018 |
| CN | 109133779 | A * | 1/2019 |
| CN | 109650806 | A * | 4/2019 |
| CN | 110002817 |   | 7/2019 |
| CN | 110482943 |   | 11/2019 |
| JP | 06-267120 |   | 9/1994 |

\* cited by examiner

*Primary Examiner* — Anthony J Green
(74) *Attorney, Agent, or Firm* — WENDEROTH, LIND & PONACK, L.L.P.

(57) ABSTRACT

Disclosed is a method for preparing high-strength coral aggregate concrete under low pressure conditions, including the following steps: weighing cement, mineral admixture, coral aggregate, mixing water, water reducer, and defoamer; mixing the cement and the mineral admixture well to obtain a cementing material; putting the coral aggregate, sea water, water reducer, defoamer, and 55-85% of the cementing material into a closed mixing system to stir for 10-15 min under low pressure conditions, and pouring the remaining cementing material into the mixing system to stir for additional 10-15 min to prepare the high-strength coral aggregate concrete. The high-strength coral aggregate concrete obtained has advantages of high mechanical properties, high compactness, excellent impermeability and durability, drawing on local resources in construction engineering on remote islands and reefs, and maximum resource utilization.

1 Claim, 1 Drawing Sheet

METHOD FOR PREPARING HIGH-STRENGTH CORAL AGGREGATE CONCRETE UNDER LOW PRESSURE CONDITION

The present application claims priority to Chinese Patent Application No. CN201910673815.9, filed with the China National Intellectual Property Administration (CNIPA) on Jul. 24, 2019 and entitled "METHOD FOR PREPARING HIGH-STRENGTH CORAL AGGREGATE CONCRETE UNDER LOW PRESSURE CONDITION", the entire contents of which are incorporated herein by reference.

TECHNICAL FIELD

The present disclosure relates to the technical field of construction engineering materials, and in particular to a method for preparing high-strength coral aggregate concrete under low pressure conditions.

BACKGROUND

In the case of not destroying local ecological environment and maximizing the use of resources, full coral concrete prepared with coral clast as aggregate and sea water instead of fresh water is of great significance for reducing the construction cost of on remote islands and reefs and shortening the construction period. With the gradual improvement of infrastructure and military protection engineering on marine islands and reefs, some special island and reef engineering constructions have higher requirements for the performance of coral concrete, especially strength. However, there are many voids and defects in the coral aggregate, and the strength of the aggregate is low; at the same time, there are a large number of open pores on the surface of the coral aggregate. The surface is rough and the water demand is large. Compacted molding results in reduced strength due to excessively low flowability of the coral concrete with a low water-binder ratio. Therefore, the coral concrete prepared by conventional methods often has the disadvantages of low compactness, small elastic modulus, high porosity, and low strength. It is difficult to prepare high-strength coral concrete by using aggregate surface treatment and reducing the water-binder ratio. Moreover, strength improvement effect is limited, and further development and application of the coral concrete are substantially restricted.

SUMMARY

An objective of the present disclosure is to provide a method for preparing high-strength coral aggregate concrete under low pressure conditions.

The specific steps are as follows:
(1) weighing the following raw materials: 20-5 parts by weight of cement, 5-18 parts by weight of mineral admixture, 45-59 parts by weight of coral aggregate, 10-16 parts by weight of mixing water, water reducer, and defoamer, where the weight of the water reducer is 2-5% of the sum of the weights of the cement and the mineral admixture, and the weight of defoamer is 2-6% of the sum of the weights of the cement and the mineral admixture.
(2) mixing the cement and the mineral admixture weighed in step (1) well to obtain a cementing material;
(3) arranging a closed concrete mixing system, where the system comprises a mixing drum, a vacuum pump, a stirring motor, a detachable sealing cover, a gauge, an air valve, stirring blades, a manual stirring rotary handle and a detachable pin, where the detachable sealing cover is provided with the manual stirring rotary handle, a pipe joint and a gauge interface, the vacuum pump is connected to the pipe joint of the detachable sealing cover through a pipe with an air valve, and the gauge is disposed on the gauge interface of the detachable sealing cover for real-time monitoring of the state of the mixing drum, the stirring motor is connected to the stirring blades for controlling electric stirring, and the detachable sealing cover and the mixing drum are connected by the detachable pin;
(4) putting the coral aggregate, mixing water, water reducer, and defoamer weighed in step (1), along with 55-85% of the weight of the cementing material prepared in step (2), into the mixing drum of the closed concrete mixing system arranged in step (3), closing the detachable sealing cover, opening a port of the air valve, and starting the vacuum pump to form a low pressure state in the mixing drum; closing the port of the air valve to stop vacuuming, and starting the stirring motor to stir for 10-15 min; turning off the stirring motor to stop stirring, opening the air valve and the detachable sealing cover, pouring all the remaining cementing material prepared in step (2) into the mixing drum, closing the detachable sealing cover, and opening the port of the air valve, and starting the vacuum pump to form a low pressure slate in the mixing drum; closing the port of the air valve to stop vacuuming, starting the stirring motor to stir for 10-15 min; turning off the stirring motor to stop stirring, opening the air valve and the detachable sealing cover, and finally pouring a specimen; and
(5) demolding the specimen poured in step (4) after 24 h, and curing the specimen in normal temperature mixing water for 28 days to obtain high-strength coral aggregate concrete.

The cement may be common cement for construction, specifically general purpose Portland cement, special purpose Portland cement, or aluminate cement, among which the general purpose Portland cement may be Portland cement, ordinary Portland cement, slag Portland cement, Portland Pozzolana cement, Portland fly ash cement, or composite Portland cement.

The mineral admixture may be one or more of fly ash, silica fume, slag powder, steel slag powder, phosphorus slag powder, and quartz powder.

The coral aggregate may be natural or artificially broken coral clasts with a maximum particle size range of less than 10 mm, and intermittent or continuous gradation of one or more gradation ranges may be selected.

The mixing water may be fresh water, desalinated sea water or sea water.

The water reducer may be one or more of lignin-based, naphthalene-based and resin-based superplasticizers.

The defoamer may be one or more of common silicone and polyether defoamers.

The gauge may include but not be limited to a vacuum gauge.

The low pressure may be lower than 1 atmosphere, and may include a vacuum or near-vacuum state.

The high-strength coral aggregate concrete of the present disclosure can be used for various concrete-based engineering constructions on marine islands and reefs and the coast.

Compared with the traditional technology, the present disclosure has the following beneficial effects: (1) Stirring under low pressure conditions is beneficial to expel air from open voids of the coral aggregate and the cementing material, and promote the cement material to fill the pores (or voids) of the coral aggregate. (2) Add cement material in batches and stir. First, a majority of the cementing material is added. On this occasion, relatively high water-binder ratio can ensure excellent fluidity of cement slurry. Once the air in the open pores of the coral aggregate is expelled in a negative pressure manner, the cement slurry or finer coral powders will fill in the open pores of the coral aggregate, thereby reducing internal defects of the coral aggregate; meanwhile, this method can effectively prevent the cementing material at a low water-binder ratio from being too viscous and too low-flowing to penetrate into the open pores of the coral aggregate, resulting in a more serious "clumping" phenomenon of freshly mixed coral concrete. After that, the remaining part of the cementing material is added to absorb excess water in the cement slurry, reduce the water-cement ratio and enhance the interface strength. After hardening, the porosity of the coral concrete is substantially reduced, and the strength and impermeability are significantly improved. (3) Incorporation of the defoamer effectively reduces the number of 2-5 mm bubbles formed by the retention of the air in the open pores of the coral aggregate in hydrated products of the cementing material after expelling under low pressure conditions. This substantially reduces the porosity of the coral concrete after hardening. (4) In addition, by optimizing the composition of the coral concrete and adjusting the particle size gradation of the coral aggregate, the present disclosure further strengthens the interface strength between the coral aggregate and the hydrated product of the cementing material, so that mechanical properties of the coral concrete are significantly improved finally.

The present disclosure has the following advantages: The strength of the coral aggregate concrete of the present disclosure is substantially improved, and the strength grade can be up to C80-100 and above. Compared with high-strength coral aggregate concrete stirred in an atmospheric environment, 28-day compressive strength is increased by more than 30%, and flexural strength is increased by more than 25%. According to the definitions of the *Technical Specification for Application of High-strength Concrete* (JGJ/T 281-2012), the coral concrete prepared by the present disclosure satisfies the strength requirements of high-strength concrete and meets the requirements for high-strength concrete in civil concrete work and the requirements of protective engineering for concrete strength; the porosity of the high-strength coral aggregate concrete of the present disclosure is reduced to 4-10%, which is only 20-40% of ordinary coral concrete, and the impermeability and durability thereof are substantially improved: the high-strength coral aggregate concrete of the present disclosure can be principally used for various concrete projects in marine island reef and coast construction, which meets the requirements of greening and economical civil engineering; the preparation method is simple and easy to operate, meets the technical requirements of projects for concrete, and have obvious technical and economic benefits.

Figure 1:
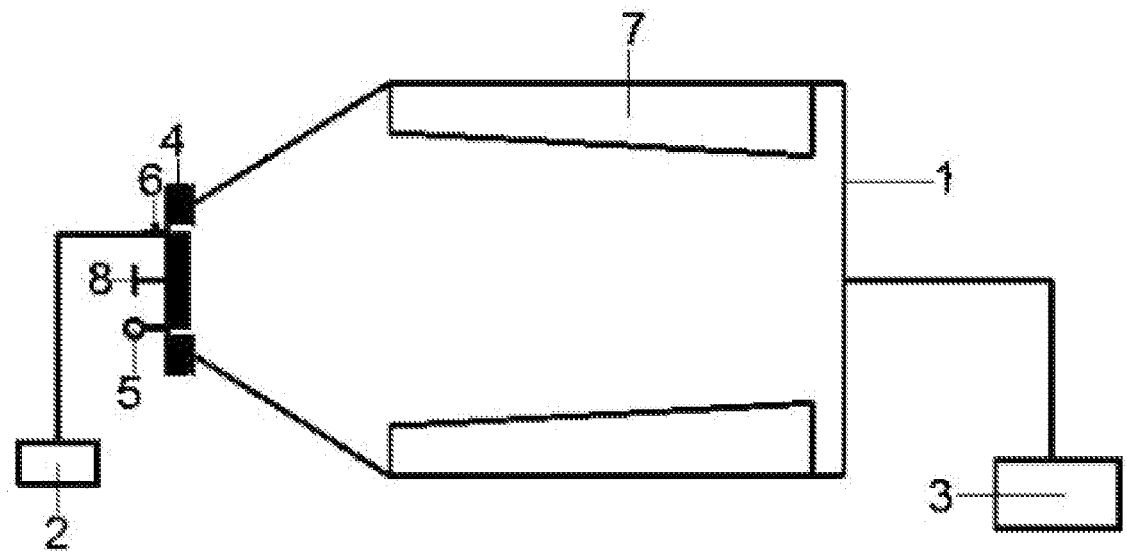
FIG. 1 schematically illustrates the structure of a vacuum closed concrete mixing system according to the embodiment of the present disclosure.
Figure 2:
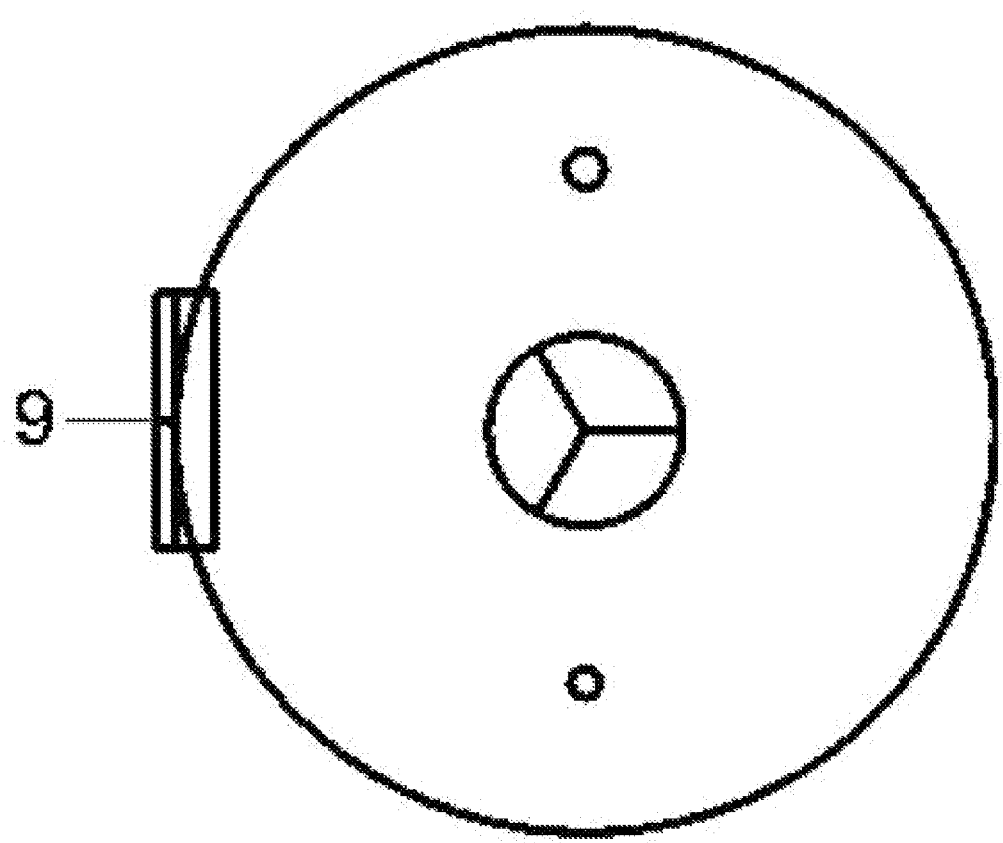
FIG. 2 schematically illustrates the structure of a detachable sealing cover used in the embodiment of the present disclosure.

where: 1 presents a mixing drum; 2 presents a vacuum pump; 3 presents a stirring motor; 4 presents a detachable sealing cover; 5 presents a vacuum gauge, 6 presents an air valve; 7 presents a stirring blade; 8 presents a manual stirring rotary handle; and 9 presents a detachable pin.

DETAILED DESCRIPTION

The present disclosure will be described in detail below with reference to an embodiment and accompanying drawings.

The following example is provided to assist those skilled in the art to further understand the present disclosure, but does not limit the present disclosure in any way. It should be noted that several variations and improvements can also be made by one of ordinary skill in the art without departing from the conception of the present disclosure. These all belong to the protection scope of the present disclosure.

Example

Provided was a method for preparing high-strength coral aggregate concrete under low pressure conditions.
1. The mix proportion of raw materials per cubic meter was as follows:
   Coral aggregate weighed 1.440 kg, with a fineness modulus of 2.6; particle size gradation of coral powder was: 2.36-4.75 mm, 7.66%; 1.18-2.36 mm, 10.3%; 0.6-1.18 mm, 34.25%; 0.3-0.6 mm, 39.36%; 0.15-0.3 mm, 7.3%; and less than 0.15 mm, 1.2%.
   Cement weighed 960 kg, 840 kg, and 720 kg, and was Portland cement with a cement mark of P•II 52.5R.
   Silica fume weighed 0 kg, 120 kg, and 240 kg, with an average particle size of 0.1 μm and a surface area of 15-20 $m^2$/g.
   Fly ash weighed 240 kg, which was Grade 11 fly ash, with a density of 2,700 kg/$m^3$, a specific surface area of 450 $m^2$/kg, a loss on ignition of 3.5%, and a water demand of 95%.
   Sea water weighed 360 kg, which was formulated with sea salt according to the composition of the sea water of the South China Sea.
   Water reducer weighed 4.8 kg, which was a polycarboxylate-based superplasticizer with a water-reducing rate of 20%.
   Defoamer weighed 4.8 kg, which was a polyether modified silicone defoamer.
2. The specific steps for preparing high-strength coral aggregate concrete under vacuum were as follows:
   (1) All the raw materials were weighed for later use according to the above composition requirements.
   (2) The cement and the mineral admixture were mixed well to prepare a cementing material for use.
   (3) A vacuum closed concrete mixing system was arranged. The system included a mixing drum 1, a vacuum pump 2, a stirring motor 3, a detachable sealing cover 4, a vacuum gauge 5, an air valve 6, stirring blades 7, a manual stirring rotary handle 8, and a detachable pin 9. The detachable sealing cover 4 was provided with the manual stirring rotary handle 8, a pipe joint and a gauge interface, the vacuum pump 2 was connected to the pipe joint of the detachable sealing cover 4 through a pipe with the air valve 6, and the vacuum gauge 5 was disposed on the gauge interface of the detachable sealing cover 4 for real-time monitoring of the vacuum degree in the mixing drum, the stirring motor 3 was connected to the stirring blades 7 for controlling electric stirring, and the detachable sealing cover 4 and the mixing drum 1 were connected by the detachable pin 9.

(4) The coral aggregate, mixing water, water reducer, and defoamer weighed in step (1), along with 70% of the cementing material prepared in step (2), were put into the mixing drum 1 of the vacuum closed concrete mixing system arranged in step (3), the detachable sealing cover 4 was closed, a port of the air valve 6 was opened, and the vacuum pump 2 was started to form a low pressure state in the mixing drum 1: the port of the air valve 6 was closed to stop vacuuming, and the stirring motor 3 was started to stir for 10-15 min; the stirring motor 3 was turned off to stop stirring, the air valve 6 and the detachable sealing cover 4 were opened, all the remaining 30% of the cementing material prepared in step (2) was poured into the mixing drum 1, the detachable sealing cover 4 was closed, and the port of the air valve 6 was opened, and the vacuum pump 2 was started to form a low pressure state in the mixing drum 1; the port of the air valve 6 was closed to stop vacuuming, the stirring motor 3 was started to stir for 10-15 min; the stirring motor 3 was turned off to stop stirring, the air valve 6 and the detachable sealing cover 4 were opened, and finally a 150×150×150 mm cubic specimen and a 100×100×400 mm prism specimen were poured.

(5) The specimens poured in step (4) were demolded after 24 h, and cured in normal temperature seawater for 28 days to obtain high-strength coral aggregate concrete.

The compressive strength, flexural strength, and porosity were tested for the high-strength coral aggregate concrete specimen prepared in this embodiment. The results are shown in Table 1.

TABLE 1

Test results of the high-strength coral aggregate concrete

| Cement/kg | Silica fume/kg | Compressive strength/MPa | Flexural strength/MPa | Porosity/% |
|---|---|---|---|---|
| 960 | 0 | 89.77 | 10.4 | 6.17 |
| 840 | 120 | 112.20 | 11.1 | 5.37 |
| 720 | 240 | 108.30 | 10.3 | 5.13 |

The coral aggregate concrete prepared in this embodiment has excellent workability and meets the technical requirements of projects for concrete: the strength grade thereof can be up to C85-100 and above. Compared with the fact that currently published strength of the coral concrete is mostly 20-50 MPa, the strength of the coral aggregate concrete prepared in the embodiment is substantially improved. According to the definitions of the *Technical Specification for Application of High-strength Concrete* (JGJ/T 281-2012), the coral concrete prepared by the present disclosure satisfies the strength requirements of high-strength concrete and meets the requirements for high-strength concrete in civil concrete work and the requirements of protective engineering for concrete strength; the porosity of the high-strength coral aggregate concrete prepared by the present disclosure is reduced to 5.10-6.17%, which is only 20-30% of ordinary coral concrete, and the impermeability and durability thereof are substantially improved.

The description of the above example is only intended to assist in understanding the method and the core concepts of the present disclosure. It should be noted that several improvements and modifications may also be made by those of ordinary skill in the art without departing from the spirit of the present disclosure and fall within the scope of the claims of the present disclosure. A plurality of amendments to the embodiment is apparent to those skilled in the art, and general principles defined herein can be achieved in the other embodiments without departing from the spirit or scope of the present disclosure. Thus, the present invention will be not limited to these examples shown herein, but shall accord with the widest scope consistent with the principles and novel characteristics disclosed by this application.

What is claimed is:

1. A method for preparing high-strength coral aggregate concrete under low pressure conditions, comprising the following specific steps:

(1) weighing the following raw materials: 20-45 parts by weight of cement, 5-18 parts by weight of mineral admixture, 45-58 parts by weight of coral aggregate, 10-16 parts by weight of mixing water, water reducer, and defoamer, wherein the weight of the water reducer is 2-5% of the sum of the weights of the cement and the mineral admixture, and the weight of defoamer is 2-6% of the sum of the weights of the cement and the mineral admixture;

(2) mixing the cement and the mineral admixture weighed in step (1) well to obtain a cementing material;

(3) arranging a closed concrete mixing system, wherein the system comprises a mixing drum, a vacuum pump, a stirring motor, a detachable sealing cover, a gauge, an air valve, stirring blades, a manual stirring rotary handle and a detachable pin, wherein the detachable sealing cover is provided with the manual stirring rotary handle, a pipe joint and a gauge interface, the vacuum pump is connected to the pipe joint of the detachable sealing cover through a pipe with the air valve, and the gauge is disposed on the gauge interface of the detachable sealing cover for real-time monitoring of the state of the mixing drum, the stirring motor is connected to the stirring blades for controlling electric stirring, and the detachable sealing cover and the mixing drum are connected by the detachable pin;

(4) putting the coral aggregate, mixing water, water reducer, and defoamer weighed in step (1), along with 55-85% of the weight of the cementing material prepared in step (2), into the mixing drum of the closed concrete mixing system arranged in step (3), closing the detachable sealing cover, opening a port of the air valve, and starting the vacuum pump to form a low pressure state in the mixing drum; closing the port of the air valve to stop vacuuming, and starting the stirring motor to stir for 10-15 min; turning off the stirring motor to stop stirring, opening the air valve and the detachable sealing cover, pouring all the remaining cementing material prepared in step (2) into the mixing drum, closing the detachable sealing cover, and opening the port of the air valve, and starting the vacuum pump to form a low pressure state in the mixing drum; closing the port of the air valve to stop vacuuming, starting the stirring motor to stir for 10-15 min; turning off the stirring motor to stop stirring, opening the air valve and the detachable sealing cover, and finally pouring a specimen; and (5) demolding the specimen poured in step (4) after 24 h, and curing the specimen in normal temperature mixing water for 28 days to obtain high-strength coral aggregate concrete;

wherein the cement is one or more of general purpose Portland cement, special purpose Portland cement, or aluminate cement, wherein the general purpose Portland cement is Portland cement, ordinary Portland cement, slag Portland cement, Portland Pozzolana cement, Portland fly ash cement, or composite Portland cement;

the mineral admixture is one or more of fly ash, silica fume, slag powder, steel slag powder, phosphorus slag powder, and quartz powder;

the coral aggregate is natural or artificially broken coral clasts with a maximum particle size range of less than 10 mm, and intermittent or continuous gradation of one or more gradation ranges is selected;

the mixing water is fresh water, desalinated sea water or sea water;

the water reducer is one or more of lignin-based, naphthalene-based and resin-based superplasticizers;

the defoamer is one or more of common silicone and polyether defoamers;

the gauge comprises but is not limited to a vacuum gauge;

the low pressure is lower than 1 atmosphere, and comprises a vacuum or near-vacuum state.

\* \* \* \* \*